United States Patent [19]
Perkinson

[11] Patent Number: 5,210,652
[45] Date of Patent: May 11, 1993

[54] FOLD-UP TWO-POSITION REAR VIEW MIRROR FOR A VEHICLE

[76] Inventor: Walter E. Perkinson, 301 La Casa Dr., Kerrville, Tex. 78028

[21] Appl. No.: 875,067

[22] Filed: Apr. 28, 1992

[51] Int. Cl.⁵ .............................. G02B 7/18; B60R 1/04
[52] U.S. Cl. .................................... 359/841; 359/877; 248/484
[58] Field of Search ............... 359/841, 843, 844, 872, 359/873, 874, 876, 877; 248/479, 481, 484, 485, 486, 487, 549, 900

[56] References Cited

U.S. PATENT DOCUMENTS

| | | | |
|---|---|---|---|
| 2,085,000 | 6/1937 | Borba et al. | 359/841 |
| 3,005,383 | 10/1961 | Pierson | 359/841 |
| 3,950,081 | 4/1976 | Yamashita et al. | 359/861 |
| 4,286,840 | 9/1981 | Covert | 359/841 |
| 4,626,084 | 12/1986 | Kumai | 350/604 |
| 4,692,000 | 9/1987 | Sakuma | 350/637 |
| 4,919,526 | 4/1990 | Umekawa | 350/604 |
| 4,934,802 | 6/1990 | Fluharty et al. | 359/841 |
| 4,936,670 | 6/1990 | Yoo | 350/604 |
| 4,940,322 | 7/1990 | Hamamoto | 350/637 |
| 4,969,727 | 11/1990 | Harloff | 350/637 |
| 4,981,347 | 1/1991 | Nakayama | 350/604 |

FOREIGN PATENT DOCUMENTS

| | | | |
|---|---|---|---|
| 0406519 | 1/1991 | European Pat. Off. | 359/844 |
| 2611174 | 8/1988 | France | 359/843 |
| 0209436 | 12/1982 | Japan | 359/844 |
| 0150850 | 7/1986 | Japan | 359/841 |
| 0215142 | 9/1986 | Japan | 359/841 |
| 0658679 | 10/1951 | United Kingdom | 359/841 |

Primary Examiner—Bruce Y. Arnold
Assistant Examiner—R. D. Shafer
Attorney, Agent, or Firm—Gunn, Lee & Miller

[57] ABSTRACT

An inside rear view mirror system (10) for motor vehicle (18) employs a two-position rotary-action solenoid (16) electronically activated from a switch (54) mounted on the steering wheel spoke (52) for momentarily locating the rear view mirror (36) in a down position when the switch (54) is depressed and releasing the solenoid (16) to rotate mirror (36) to a normally up position when the switch (54) is released.

8 Claims, 4 Drawing Sheets

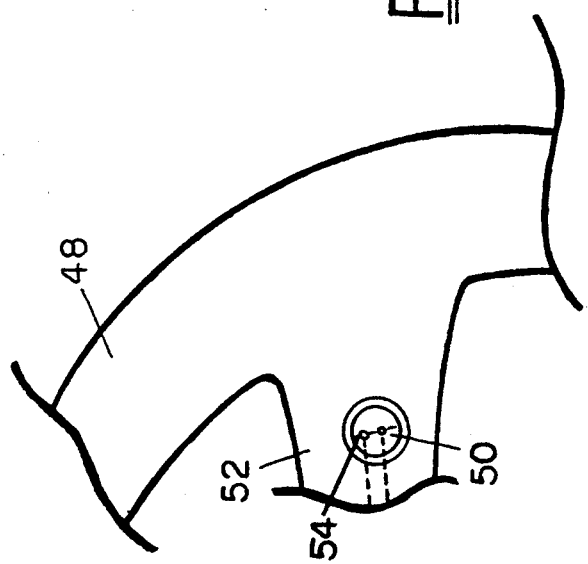

FOLD-UP TWO-POSITION REAR VIEW MIRROR FOR A VEHICLE

FIELD OF THE INVENTION

The invention relates to motor vehicle mirrors in general, more particularly to an electronic rear view mirror foldable between a normally stowed position against the headliner of a vehicle roof to a down position when in use.

BACKGROUND

A number of patents provide for electronically operated fold-away, outsidemounted, rear view mirror systems for vehicles. These patents include:

U.S. Pat. No. 4,969,727 (Harloff et al. 1990), which discloses a foldable mirror for locating on the outside door of an automobile in which a motor engaging the mirror is located in the mirror housing and driven by a pinion gear, capable of swiveling the mirror along two axes.

U.S. Pat. No. 4,981,347 (Nakayama 1991) discloses an electrically driven system capable of operating a rear view mirror located on the outside door of a motor vehicle which uses a rotating action through a system of relays and motors.

U.S. Pat. No. 4,940,322 (Hamamoto et al. 1990) discloses a drive system that is capable of rotating a mirror located on the outside door of an automobile from an operable position to a fold-away position.

U.S. Pat. No. 4,936,670 (Yoo 1990) discloses a rear view mirror actuated by a D.C. motor capable of rotating the mirror along a screw shaft.

U.S. Pat. No. 4,919,526 (Umekawa et al. 1990) discloses yet another gear-driven, foldable, door-mounted mirror.

U.S. Pat. No. 4,893,916 (Sakuma et al. 1990) discloses an electrically-operated, door-mounted rear view mirror which is capable of being manually rotated and contains a unique axle to provide for such movement.

U.S. Pat. No. 4,626,084 (Kumai 1986) discloses a foldable rear view mirror, door mounted, driven by a pinion gear off the output shaft of an electrical motor.

While these patents have recognized the advantages of a foldable mirror in general, none have recognized the advantages of Applicant's unique two-position, rotary solenoid-operated, rear view mirror for locating at or near the head (upper frame) of the interior of a motor vehicle windshield.

Applicant has recognized the need for providing a normally stowed rear view mirror so as to provide a clear view for the driver through the windshield of the motor vehicle. Applicant has also recognized the advantages of providing for a normally stowed rear view mirror activated by a momentary switch located on the steering wheel which will release the rear view mirror from its normally stowed position to a use position when the switch is activated. Applicant has also recognized the advantages of simplicity of design and operation provided by such a mechanism as is described and claimed herein.

SUMMARY OF THE INVENTION

Applicant has provided for these advantages and others in an inside rear view mirror for a motor vehicle which employs a two-position, rotary-action solenoid electronically activated from a switch mounted on the steering wheel spoke for momentarily locating the rear view mirror in a down position when the switch is depressed and releasing the solenoid to a normally up position when the switch is released.

BRIEF DESCRIPTION OF THE FIGURES

FIG. 5 is a front elevational view showing part of the steering wheel of Applicant's invention illustrating a button-operated momentary switch to energize the solenoid of Applicant's invention.

DETAILED DESCRIPTION OF THE PREFERRED EMBODIMENTS

Figure 1:
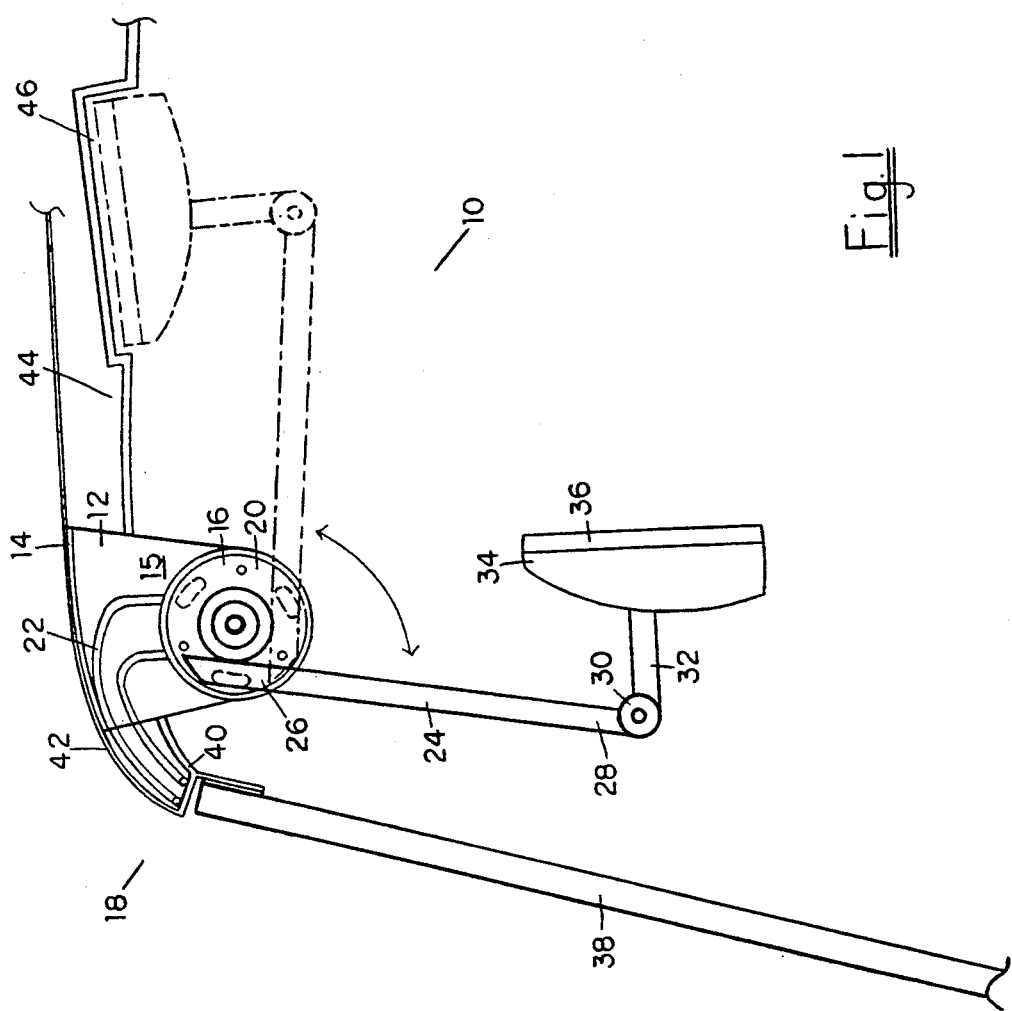
FIG. 1 is an elevational side view of the folding mirror of Applicant's invention, showing the mirror in a use position (solid lines) and a stowed position (dashed lines).

Turning now to FIG. 1, FIG. 1 illustrates Applicant's folding mirror system (10) in a use position (solid lines) and in a stowed position (dashed lines). More specifically, FIG. 1 illustrates the components and operation of folding mirror system (10). Folding mirror system (10) is comprised of a base (12) having a roof mounting leg (14) and a solenoid mounting leg (15). The two legs (14) and (15) are generally perpendicular to one another and provide a support base for mounting the system to the roof or, alternately, to a windshield frame or a headliner of a motor vehicle (18). Base (12) is usually made of metal and roof mounting leg (14) is permanently attached to vehicle (18) using conventional attachment means such as bolts or rivets, or by welding or the like.

Mounted to solenoid mounting leg (15) is rotary solenoid (16). Rotary solenoid (16) is spring loaded in one direction (preferably up or stowed) and has a mounting plate (20) attached thereto for rotation between 70° and 120° (preferably 95°), upon being energized. Rotary solenoid (16) is energized through electrical wires (22) which are connected to the electrical system of motor vehicle (18).

Connected to mounting plate (20) of rotary solenoid (16) is a mirror mounting arm (24). Mounting arm (24) is mounted at a first end (26) to mounting plate (20). At a second end (28) of mounting arm (24) is located a conventional adjustable joint (30) which allows the mirror of the system to pivot in two axes, up and down and side to side, as viewed in FIG. 1. A mirror arm (32) connects adjustable joint (30) to a mirror housing (34). Mirror housing (34) is conventional and contains mirror (36) either mounted on the surface or enclosed within.

Windshield (38) of motor vehicle (18) has a head or upper frame (40) which is joined to roof (42) and headliner (44). As can be seen in FIG. 1, headliner (44) may be dimensioned with a pocket (46) therein to provide for a pleasing appearance and also for protection, to receive mirror housing (34) when system (10) is in the stowed position.

Figure 2:
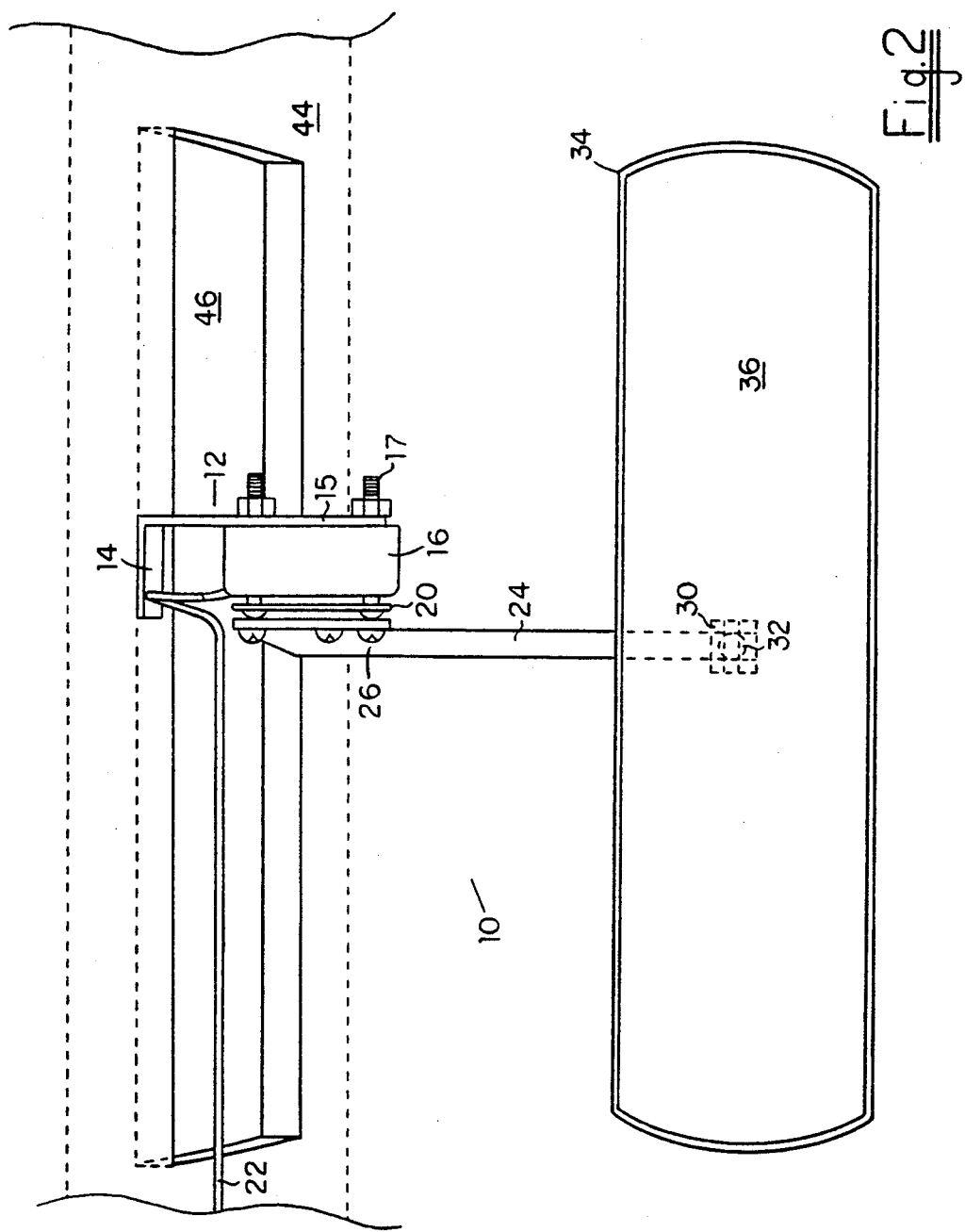
FIG. 2 is a front elevational view of the folding mirror of Applicant's invention, again showing the two positions.

FIG. 2 illustrates the system housing nut-and-bolt combination (17) used to retain rotary solenoid (16) to solenoid mounting leg (15). As can be seen in FIG. 2 mirror housing (34) will fit comfortably within protective pocket (46) when system (10) is in a stowed position. Moreover, as can be readily appreciated from FIG. 2 when system (10) is in a stowed position, the driver's view through windshield (38) is clearly enhanced.

Rotary solenoid (16) is spring loaded such that when not energized it will hold system (10) in a stowed position. When the power is "on" the solenoid is energized from the electrical system of the motor vehicle (18) and drives the mirror (36) to a down position. The mirror (36) previously has been adjusted by the driver while it was in a down position and will therefore provide the driver with a view to the rear of motor vehicle (18).

A rotary solenoid that should provide satisfactory in operation is an intermittent duty solenoid with 95° of rotary action available from Lucas Ledex, Inc., 801 Scholz Drive, P. O. Box 427, Vandalia, Ohio 45377-0427. Rotation can be either right-hand or left-hand, depending upon which side of the mounting plate the rotary solenoid (16) is mounted. Moreover, two solenoids (16) can be used, one opposite the other, to provide positive movement in each direction.

Figure 3:
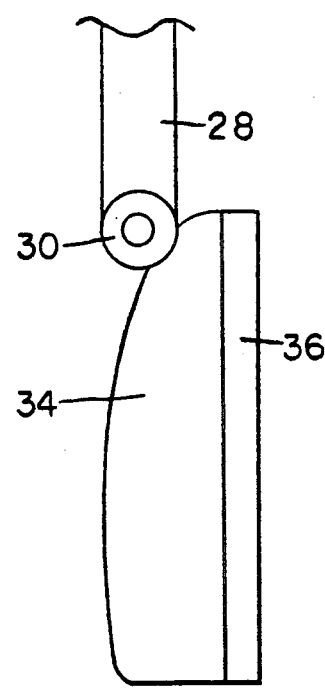
FIG. 3 is a preferred alternate embodiment illustrating means of attaching the mounting arm of Applicant's folding mirror to the mirror housing.
Figure 4:
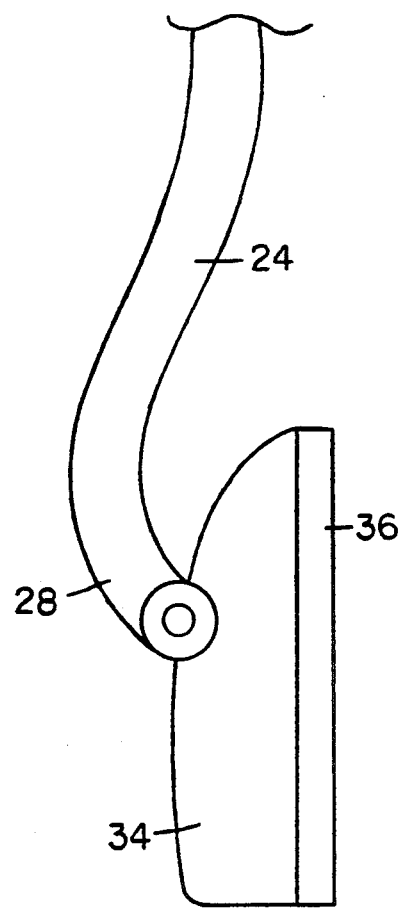
FIG. 4 is another preferred alternate embodiment illustrating means of attaching the mounting arm of Applicant's folding mirror to the mirror housing.

FIGS. 3 and 4 illustrate two alternate embodiments where removed end (28) of mounting arm (24) is attached directly to mirror housing (34) through adjustable joint (30), thereby omitting mirror arm (32). Note that mounting arm (24) in FIG. 4 is curved to provide both for a pleasing appearance and to allow housing (34) to recess in pocket (46) when system (10) is in a closed position.

FIG. 5 illustrates a section of a steering wheel (48) which has button (50) on a spoke (52) thereof. More specifically, FIG. 5 illustrates an embodiment of system (10) which provides a momentary switch (54) activated by button (50), wired in series with rotary solenoid (16), to energize system (10) and hold mirror (36) in the use position as illustrated by the solid lines in FIGS. 1 and 2. When the driver of vehicle (18) releases button (50) which contains momentary switch (54), mirror (36) will return to the stowed position in pocket (46). The switch should be located proximate to the rim of the steering wheel such that it may be reached without completely removing the hand from the rim.

Terms such as "left", "right", "up", "down", "bottom", "top", "front", "back", "in", "out" and the like are applicable to the embodiment shown and described in conjunction with the drawings. These terms are merely for the purposes of description and do not necessarily apply to the position or manner in which the invention may be constructed or used.

Although the invention has been described with reference to a specific embodiment, this description is not meant to be construed in a limiting sense. On the contrary, various modifications of the disclosed embodiments will become apparent to those skilled in the art upon reference to the description of the invention. It is therefore contemplated that the appended claims will cover such modifications, alternatives, and equivalents that fall within the true spirit and scope of the invention.

I claim:

1. In combination with a motor vehicle an interior, electronically-operated, foldable, rear view mirror system located inside the passenger compartment of a motor vehicle, the system comprised of:
   a metal base having a first leg and a second leg, the first and the second legs generally perpendicular to one another;
   first attachment means for attaching the first leg of said metal base at or near the upper end of a windshield;
   a rotary-action solenoid with a rotating mounting plate thereon;
   second attachment means for attaching said rotary action solenoid to the second leg of said metal base;
   a mounting arm with a first end and a second end including means to attach at the first end thereof said mounting arm to the mounting plate of said solenoid;
   a rotatable joint attached to the second end of said mounting arm;
   a mirror housing for attachment to said rotatable joint;
   a mirror dimensioned to engage said housing; and
   a headliner having walls defining a storage pocket dimensioned to receive said mirror housing;
   wherein said solenoid maintains said mirror in a normally stowed position with said mirror against a headliner of the interior of the vehicle and when activated rotates said mirror to a down or use position the rotation of said mirror being in an arc, the plane of which is parallel to a plane bisecting the motor vehicle laterally.

2. The device in claim 1 further including a momentary switch wired in series with said solenoid to hold said mirror in the down position when said switch is engaged, and to return said mirror to the stowed position in said storage pocket of the headliner when said switch is disengaged.

3. The device as described in claim 2 wherein said momentary switch is located proximate to the rim of the steering wheel of the motor vehicle.

4. The device in claim 3 wherein said solenoid is capable of rotating said mounting arm in the range of 70° to 120°.

5. The device in claim 4 wherein said solenoid is an intermittent type solenoid and is energized through said momentary switch by an electrical system of the motor vehicle.

6. A foldable, rear view mirror system, electronically operated by the electrical system of a motor vehicle, for locating inside the passenger compartment of the motor vehicle, the system comprising:
   a metal base;
   first attachment means for attaching said metal base at or near the head of a windshield of the motor vehicle;
   an intermittent, rotary action solenoid with a rotating plate mounted thereon;
   second attachment means for attaching said rotary action solenoid to said metal base;
   a mounting arm with a first end and a second end including at the first end thereof attachment means to attach said mounting arm to the rotating plate of said solenoid;
   a rotatable joint attached to the second end of said mounting arm;
   a mirror housing for attachment to said rotatable joint;
   a mirror dimensioned to engage said mirror housing;
   a stowage compartment dimensioned to substantially receive said mirror and said mirror housing therein, said stowage compartment located in the headliner of the motor vehicle; and
   a momentary switch wired in series with said rotary solenoid to hold said mirror in a down position when said switch is engaged and to return said mirror to said stowage compartment for maintaining said mirror in the stowed position when said momentary switch is disengaged.

7. The system of claim 6 wherein said rotary solenoid is capable of operating in the range of 70° to 120°.

8. The system of claim 7 wherein said momentary switch is of the button-activated type and is located proximate of the rim of the steering wheel of the motor vehicle.

* * * * *